Nov. 18, 1969 H. P. J. GILISSEN 3,479,637

PRINTED CIRCUIT CONNECTOR

Filed Sept. 20, 1966 2 Sheets-Sheet 1

1

3,479,637

PRINTED CIRCUIT CONNECTOR

Herman Petrus Johannes Gilissen, Vlijmen, Netherlands, assignor to AMP Incorporated, Harrisburg, Pa.

Continuation-in-part of application Ser. No. 561,942, June 30, 1966. This application Sept. 20, 1966, Ser. No. 580,776

Claims priority, application Netherlands, Sept. 23, 1965, 6512390

Int. Cl. H01r 13/50, 19/16

U.S. Cl. 339—176 9 Claims

ABSTRACT OF THE DISCLOSURE

A printed circuit connector comprises electrical contact element having a contact portion protruding into a channel of a dielectric housing for making electrical contact with a conductive portion of a printed circuit board when the board is inserted into the channel. The contact element also is provided with a loop, the bite of which is directed outwardly of the channel and it terminates in a free end remote from the bite and the free end lies within a pocket in the housing and it is freely movable therein. The free end is provided with a bowed portion defining an essentially U-shaped bite provided with a crest to resiliently engage the wall of the pocket thereby maintaining the loop in a prestressed condition to spring load the contact section.

Cross reference to related application

This application is a continuation-in-part of application Ser. No. 561,942, filed June 30, 1966, for Printed Circuit Edge Connector, now Patent No. 3,397,381 dated Aug. 13, 1968.

This invention relates to electrical connectors, and in particular to a printed circuit edge connector.

In the earlier application there is described an electrical connector assembly for connecting an electrical lead to a conductive portion on a printed circuit board, the assembly comprising an insulating housing defining a channel for receiving an edge of the printed circuit board, a pocket defined by the housing and communicating with the channel, and an electrical contact element in the pocket, the element having a contact spring portion formed as a loop, the bight of which is directed outwardly of the channel. One side of the loop engages one wall of the pocket adjacent the channel and has a contact portion protruding into the channel making electrical contact with the conductive portion when the board is inserted into the channel, the contact element having a connecting portion for connection to a lead. The other side of the loop has a bowed portion resiliently engaging the wall of the pocket opposite the one wall and terminating in a free end on the side of the bowed portion remote from the bight of the loop, the loop being spring loaded between the one wall of the pocket and the opposite wall of the pocket. Upon initial deflection of the loop as a result of a short initial insertion of the board, the loop is spring loaded between the board and the opposite wall of the pocket instead of between the one wall and the opposite wall of the pocket, whereby the bowed portion slides relative to the opposite wall upon further insertion of the board into the channel so that the contact force exerted by the contact portion against the conductive portion remains substantially constant and is thus substantially independent of the extent to which the loop is finally deflected.

A disadvantage of the assembly described above, is that although the contact force exerted by the contact portion against the conductive portion remains substantially constant after the initial deflection, the contact force

2 does not in fact remain exactly constant but rises, by a small amount for example by about 20 grams. The contact force may accordingly be influenced to a slight extent by irregularities in the thickness of the board or by vibration. It has been found that this effect occurs because the point of engagement of the loop with the opposite wall of the pocket moves with respect to the spring as a result of the rolling action of the loop subsequent to the initial deflection thereof, as the printed circuit board is inserted into the channel.

According to the present invention an electrical connector assembly for connecting an electrical lead to a conductive portion on a printed circuit board comprises an insulating housing defining a channel for receiving an edge of the printed circuit board, a pocket defined by the housing and communicating with the channel, and an electrical contact element in the pocket, the contact element having a contact spring portion formed as a loop the bight of which is directed outwardly of the channel, one side of the loop engaging one wall of the pocket adjacent the channel and having a contact portion protruding into the channel for making electrical contact with the conductive portion of the printed circuit board when the board is inserted into the channel, the contact element having a connecting portion for connection to the lead, the other side of the loop having a bowed portion formed by an essentially U-shaped bight the crest of which resiliently engages the wall of the pocket opposite the one wall, the other side of the loop terminating in a free end on the side of the bowed portion remote from the bight of the loop, so that upon initial deflection of the loop as a result of a short initial insertion of the panel, the loop is spring loaded between the board and the opposite wall whereby the bowed portion slides relative to the opposite wall upon further insertion of the board into the channel so that by virtue of this sliding movement the contact force exerted by the contact portion against the conductive portion remains constant and is thus independent of the extent to which the loop is finally deflected.

It has also been found that by arranging for the contact element normally to engage the one wall of the pocket only in the vicinity of the area of contact between the loop and the printed circuit board, the contact force can be made to increase more rapidly than in the connector of the application mentioned above, during the initial deflection of the loop. This also improves the independence of the contact pressure from irregularities in the thickness of the board and board vibration. To this end the contact spring may be formed with a pair of lugs which engage the one wall of the pocket, the loop protruding through the one wall of the pocket towards the insertion path of the printed circuit board and the contact element having a bent portion between the lugs and the connecting portion of the contact element, about which the spring pivots during the initial deflection of the loop.

Consequently, it is an object of this invention to provide a printed circuit edge connector which permits the insertion of a printed circuit board into the channel so that the contact pressure exerted by the contact portion against the conductive portion remains constant.

Another object is to provide a printed circuit connector in which the contact pressure is substantially uninfluenced by irregularities in the printed circuit board thickness.

Still another object is to provide a printed circuit connector which is substantially uninfluenced by vibration of the printed circuit board.

Other objects and attainments of the present invention will become apparent to those skilled in the art upon a reading of the following detailed description when taken in conjunction with the drawings in which there is shown and described a preferred embodiment of the invention;

it is to be understood, however, that this embodiment is not intended to be exhaustive nor limiting of the invention, but is given for purpose of illustration in order that others skilled in the art may more fully understand the invention and the principles thereof and the manner of applying it in practical use so that they may modify it in various forms, each as may be best suited to the conditions of the particular use.

Figures 1, 2, 3:
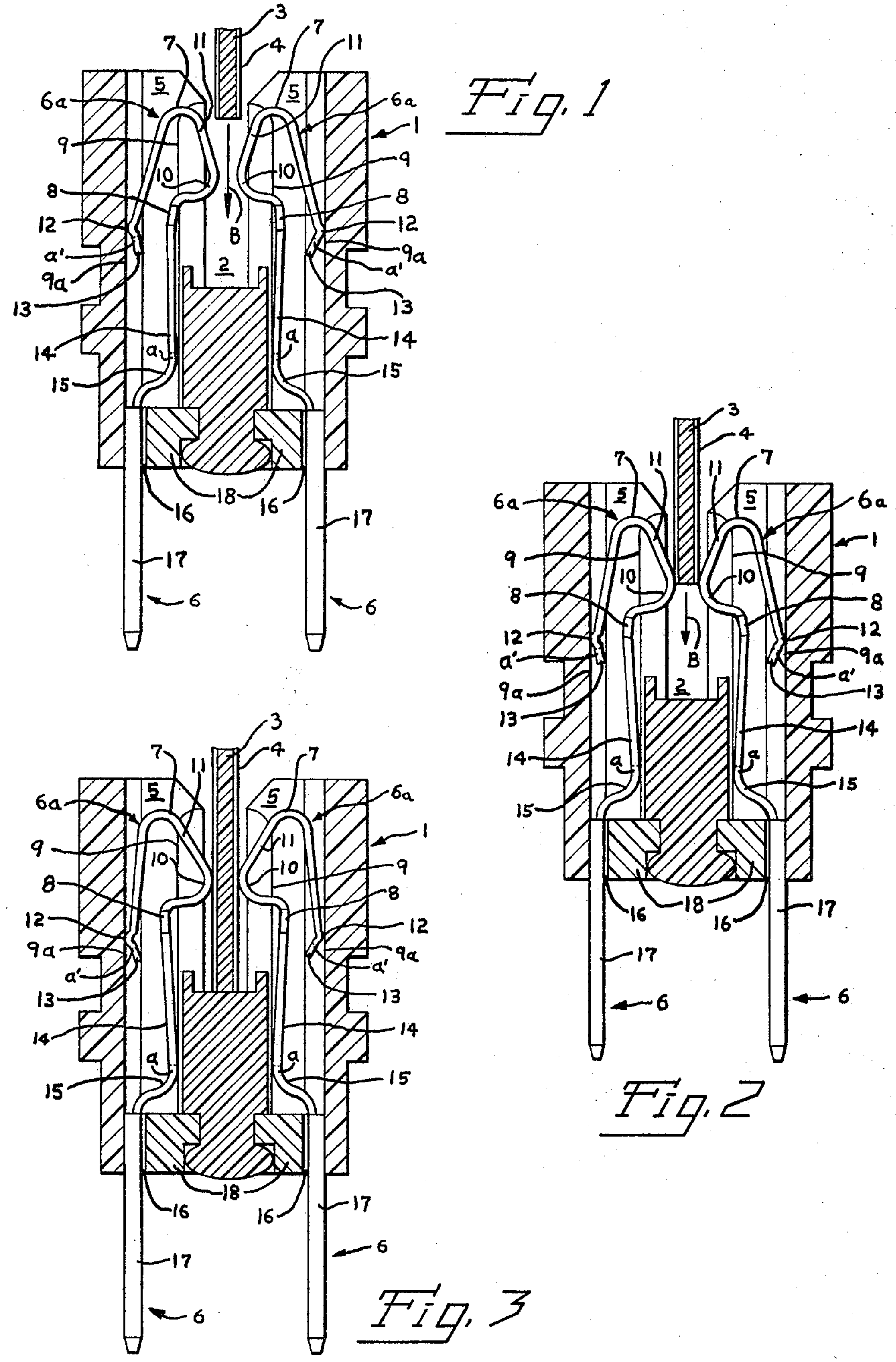
FIGURE 1 is a sectional view of an electrical connector assembly according to the invention.
FIGURE 2 is a sectional view similar to FIGURE 1 of an electrical connector assembly showing the printed circuit board partially inserted into the channel.
FIGURE 3 is a sectional view similar to FIGURES 1 and 2 of an electrical connector assembly showing the printed circuit board fully inserted into the channel.
Figure 4:
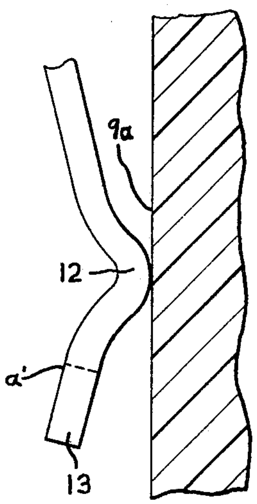
FIGURE 4 is a partially enlarged view of a detail of the assembly.

Referring to FIGURE 1, the assembly comprises an elongate insulating housing 1 defining a channel 2 for receiving the edge of a printed circuit board 3 having thereon conductive portions 4. The housing 1 defines pockets 5 (only two of which are shown) communicating with the channel 2 and each containing a sheet metal contact element 6. Each element 6 comprises a contact spring portion 6*a* formed as a loop, the bight 7 of which is located in the outer part of the pocket 5, one side of the loop having a pair of lugs 8 (only one of which is shown) engaging one wall 9 of the pocket 5 adjacent the channel 2 and a contact portion 10 protruding into the channel 2. The portion 10 is connected to the bight 7 by an inclined board-guiding portion 11 of the element 6. The other side of the loop has a bowed portion 12 formed as an essentially U-shaped bight which is preferably approximately semi-circular as shown in FIGURE 4 and the crest of which resiliently engages the opposite wall 9*a* of the pocket 5. This other side of the loop terminates in a free end 13 on that side of the portion 12 which is remote from the bight 7. The loop is connected through a straight portion 14 of the contact element and a bent portion 15 thereof to an electrical post 17 about which an electrical lead can be wrapped and which extends through a hole 16 in the housing. The contact elements are held in position in the housing by inserts 18 however, the contact elements can be held in position in the housing in any suitable manner. Each element 6 is longitudinally divided into two equal portions between points *a* and *a'* on the element 6.

The loop is spring loaded between the one wall 9 of the pocket which is engaged by the lugs 8 and the opposite wall 9*a* of the pocket which is engaged by the crest of the bent portion 12, the portions 14 and 15 of the element 6 being completely free of the housing.

When the board 3 is initially inserted in the direction of arrow B into the channel 2 (see FIGURE 2), the portions 11 are engaged by the conductive portions 4 so that the loops are initially deflected away from the walls 9 by a small amount so that the lugs 8 leave the walls 9 and the portions 14 pivot about the bent portions 15. The portions 6*a* are accordingly abruptly released from the walls 9 and the portions 14 pivot abuot predetermined points on the bent portions 15, these points being the same throughout the initial deflection of the loops. Each loop is accordingly now loaded between the board and one of the opposite walls 9*a* of the pocket 5. The contact force exerted by the portions 10 against the conductive portions 4 increases rapidly during this initial deflection, e.g. up to 160 grams. As the board is further inserted into the channel 2 and thus causing further deflection of the loops, the portions 12 slide downwardly (as seen in FIGURES 3 and 4) relative to the walls 9*a*, each of these walls being engaged by the same point on the crest of the corresponding portion 12 throughout the further deflection. The contact force accordingly remains exactly constant during the further insertion of the board into the channel 2.

Figure 5:
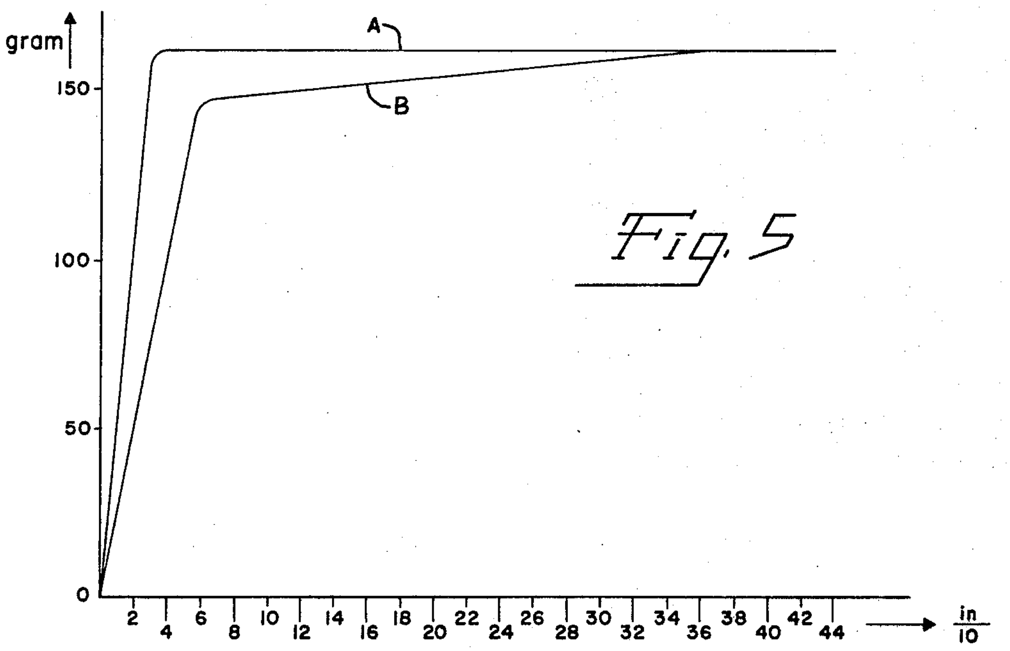
FIGURE 5 is a graph illustrating the operation of the assembly.

FIGURE 5 is a graph of which the ordinate represents the contact force expresed in grams and the abscissa the deflection of each contact portion 10 expressed in thousandths of an inch (.0254 mm.). As illustrated in FIGURE 5 (curve A) the contact force rises to 160 grams during initial deflection by .004 inch (.1016 mm.) thereafter remaining exactly constant. Curve B in FIGURE 5 pertains to an electrical connector assembly as described in the above-mentioned application. As will appear from curve B, the contact force rises to 140 grams during initial deflection by .006 inch (.1524 mm.) thereafter rising to 160 grams after final deflection by .030 inch (1.7350 mm.).

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. An electrical connector assembly for connecting an electrical lead to conductive means on a printed circuit board, the assembly comprising an insulating housing having a channel for receiving an edge of the printed circuit board, a pocket provided by the housing and communicating with the channel, an electrical contact element in the pocket, the contact element having a contact spring portion formed as a loop the bight of which is located in an outer part of the channel, one side of the loop engaging one wall of the pocket adjacent the channel and having a contact portion protruding into the channel for making electrical contact with said conductive means when the board is inserted into the channel, the contact element having a connecting portion for connection to the lead, the other side of the loop having a bowed portion defining an essentially U-shaped bight provided with a crest to resiliently engage the wall of the pocket opposite the one wall, the other side of the loop terminating in a free end which lies within the pocket and is freely movable therein, the free end lying on the side of the bowed portion which is remote from the bight of the loop, the loop being spring-loaded between the panel and the opposite wall whereby the bowed portion slides relative to the opposite wall upon further insertion of the board into the channel so that the force exerted by the sliding movement of the contact portion against the conductive means remains substantially constant and is substantially independent of the extent to which the loop is finally deflected.

2. An electrical connector assembly according to claim 1, wherein one side of the loop normally engages the one wall of the pocket only in the vicinity of the area of the contact between the loop and the printed circuit board.

3. An electrical connector assembly according to claim 1, wherein the loop has a pair of lugs which engage the one wall of the pocket, the element having a bent portion between the lugs and the connecting portion about which the loop pivots as a result of the initial deflection of the loop.

4. An electrical connector assembly according to claim 1, wherein the bowed portion is essentially of semi-circular shape.

5. An electrical connector assembly comprising, in combination, a dielectric housing and an electrical terminal, said housing having a board-receiving channel to receive therein a board having conductive means thereon and a pocket in communication with said channel, said pocket provided with a wall opposite said channel, said electrical terminal having a contact section and a conductor-receiving section, said conductor-receiving section disposed in a hole in said housing and extending outwardly from one end of said housing, said contact section being disposed in said pocket and having a loop formed therein, said loop having one end connected to said conductor-receiving section and a free end which lies within said pocket and is freely movable therein, said loop having a contact portion and a bight in an outer part of said pocket, said free end having means slidably engaging said wall thereby biasing said contact portion within said channel to apply substantially constant contact force on the conductive means when said board is inserted within said channel, and means on said contact section and said housing to maintain said free end against said wall in a pre-stressed condition to spring load said contact section.

6. An electrical connector assembly according to claim 5, wherein said bight and said contact portion are connected together by an inclined board-guiding portion.

7. An electrical connector assembly according to claim 5, wherein said free end means includes a bowed portion slidably engageable with said wall.

8. An electrical connector assembly according to claim 5, wherein said means to maintain said free end against said wall includes lugs on said contact section and wall means opposite said wall.

9. An electrical connector assembly according to claim 5, wherein said means is provided to hold said electrical terminal in position in said housing.

References Cited

UNITED STATES PATENTS

| | | | |
|---|---|---|---|
| 3,120,988 | 2/1964 | Gilbert | 339—176 |
| 3,289,148 | 11/1966 | Antes | 339—176 |

FOREIGN PATENTS

| | | |
|---|---|---|
| 624,089 | 4/1963 | Belgium. |

REINALDO P. MACHADO, Primary Examiner

PHILIP C. KANNAN, Assistant Examiner